United States Patent [19]
Lane

[11] Patent Number: 5,659,583
[45] Date of Patent: Aug. 19, 1997

[54] TONE CANCELLER FOR QAM DEMODULATOR

[75] Inventor: Frank Anton Lane, Medford Lakes, N.J.

[73] Assignee: Hitachi America, Ltd., Tarrytown, N.Y.

[21] Appl. No.: 460,586

[22] Filed: Jun. 2, 1995

[51] Int. Cl.$^6$ ...................................................... H04B 1/10
[52] U.S. Cl. .......................... 375/346; 375/350; 329/349
[58] Field of Search ................................ 375/346, 226, 375/232, 233, 235, 281, 348, 350; 364/724.19, 318; 329/320, 349, 319, 353; 455/296, 307

[56] References Cited

U.S. PATENT DOCUMENTS

| | | | |
|---|---|---|---|
| 4,589,083 | 5/1986 | Le Dinh et al. | 364/724 |
| 4,613,978 | 9/1986 | Kurth et al. | 375/99 |
| 5,047,736 | 9/1991 | Ghose | 333/12 |
| 5,084,902 | 1/1992 | Aotani et al. | 375/350 |
| 5,087,975 | 2/1992 | Citta et al. | 358/183 |
| 5,150,379 | 9/1992 | Baugh et al. | 375/348 |
| 5,162,900 | 11/1992 | Citta | 358/167 |
| 5,208,837 | 5/1993 | Richey | 375/350 |
| 5,282,023 | 1/1994 | Scarpa | 358/36 |
| 5,325,188 | 6/1994 | Scarpa | 348/624 |
| 5,325,204 | 6/1994 | Scarpa | 348/607 |
| 5,369,445 | 11/1994 | Harford | 348/618 |
| 5,400,084 | 3/1995 | Scarpa | 348/624 |

OTHER PUBLICATIONS

N.I. Cho et al., "Adaptive Line Enhancement by Using an IIR Lattice Notch Filter", IEEE Transactions on Acoustics, Speech, and Signal Processing, vol. 37, No. 4, Apr. 1989, pp. 585–589.

T.C. Hsia, "Improved algorithm for Widrow adaptive control scheme", Electronics Letters, vol. 30, No. 21, Oct. 13, 1994, pp. 1808–1809.

B. Widrow et al., "Adaptive Noise Cancelling: Principles and Applications", Proceedings of the IEEE, vol. 63, No.. 12, Dec. 1975 pp. 1692–1716.

Primary Examiner—Stephen Chin
Assistant Examiner—Kevin Kim
Attorney, Agent, or Firm—Michaelson & Wallace; Peter L. Michaelson; John T. Peoples

[57] ABSTRACT

Techniques in a QAM digital communication system for canceling one or more interference tones in an incoming signal to produce an output signal by generating an estimate of the interference tone during the current processing interval, subtracting the estimate to produce the output signal, and modifying, if necessary, adaptive circuitry for use during the next processing interval. Techniques which apply either at passband or at baseband, that is, before or after mixing the incoming signal with the recovered carrier, are disclosed. The adaptive circuitry includes a single weighting parameter or an adaptive filer. Passband techniques utilize rerotation of baseband signals to appropriately align the spectra of the processed signals.

24 Claims, 11 Drawing Sheets

5,659,583

TONE CANCELLER FOR QAM DEMODULATOR

BACKGROUND OF THE DISCLOSURE

1. Field of the Invention

This invention relates to a quadrature amplitude modulation (QAM)-based communication system and, more particularly, to interference suppression in a digital QAM demodulator.

2. Description of the Background Art

Quadrature amplitude modulation (QAM) is a particularly advantageous technique for transmitting digital data because of its efficient utilization of bandwidth. As an example, high definition television (HDTV) signals are oftentimes broadcast as compressed digital data using QAM.

In essence, QAM transmits digital data as a sequence of two-dimensional complex symbols which may be expressed in terms of level and phase, or equivalently, in terms of in-phase and quadrature components. Each symbol, based upon the data represented by the symbol, takes on a specific pre-defined value from a set of values. The set of all values, when graphically plotted in two-dimensions, forms a so-called constellation. The size and shape of the constellation depends upon the number of discrete values in the set and their spatial location in the constellation. The constellation might contain, for example, 16 or 64 values, hence called 16 QAM or 64 QAM, respectively.

To broadcast QAM, the in-phase and quadrature digital components independently modulate in-phase and quadrature carrier signals, respectively, and the modulated carriers are propagated over the given channel or medium (e.g., cable or "over-the-air" broadcast).

To detect an incoming QAM signal, a QAM receiver demodulates the in-phase and quadrature incoming sampled signals using carrier signals derived from a carrier recovery circuitry, and the demodulated outputs are filtered, with the filtered signals serving as inputs to an appropriate decoder which typically utilizes slicer circuitry to produce detected symbols.

The incoming signals to the QAM receiver are provided, for example, over broadcast channels or cable systems. One deleterious type of interference which affects the desired incoming signal is a discrete, in-band radio-frequency (RF) tone. A low power RF tone is particularly troublesome for high-order constellations because of their compactness. Previously known techniques for interference cancellation, typically implemented at the front end of the receiver, are not particularly effective because these techniques rely upon substantial power in the interfering tone. The RF tone interference produces a significant error rate by causing perturbations of the constellation points. Such interference is not atypical and may arise on a cable system from sources such as crosstalk from co-channel NTSC broadcasts or beats from NTSC carriers on the same cable system.

Techniques which address interference suppression of co-channel NTSC interference signals into QAM signals are known for broadcast applications. Representative of these techniques are the disclosures of related U.S. Pat. Nos. 5,282,023; 5,325,188; 5,325,204; and 5,400,084. The underlying technique of these references utilizes a bank of narrow band IIR filters to isolate the interfering signal and subtract it from the desired signal. This technique is accomplished at the front end of the QAM demodulator, that is, ahead of any other processing. This technique is especially suitable for high power interference, but it is less effective at detecting and removing low power interference which may still be a problem for QAM signals having a relatively large number of symbol states, that is, high order constellations. Moreover, this technique requires complex circuitry for its implementation.

Other art, as set forth in U.S. Pat. Nos. 5,087,975 and 5,162,900, for canceling NTSC co-channel interference in a vestigial sideband pulse amplitude modulated system relies on special precoding at the transmitter and a fixed filter in the demodulator. Such a technique is not easily generalized to QAM and not applicable for solutions implemented only in the receiver.

Finally, other techniques for interference cancellation have been discussed in the literature; a survey of these techniques is covered in the article entitled "Adaptive Noise Cancelling: Principles and Applications," by Widrow et al, Proc. IEEE, Vol. 63, No. 12, pages 1692–1716, December 1975. These techniques generally rely on the availability of a correlated reference signal for the interference; such a reference signal is derived from a second receiver or generated from known properties of the signal, neither of which is known or available in a typical QAM application.

Thus, the prior art is devoid of teachings or suggestions for suppressing low-level discrete RF tone interference in a QAM system which is the focus of the present invention.

SUMMARY OF THE INVENTION

These shortcomings and other limitations and deficiencies are obviated in accordance with the present invention by circuitry and concomitant methodology which generates an estimate of the interference tone during the current processing interval, subtracts the estimate from the incoming signal during the current processing interval to produce the output signal, and modifies, if necessary, adaptive circuitry for use during the next processing interval.

Broadly, in accordance with one baseband method aspect of the present invention, an interference tone in an incoming, sampled baseband signal in a QAM system is suppressed to produce an output signal by, initially, generating a tone reference from a delayed version of the incoming signal and a delayed version of the output signal. Then the tone reference is weighted by an adaptive parameter to produce a tone estimate. The tone estimate is used to correct the incoming signal, and the corrected signal is threshold detected to produce the output signal. An error signal is derived from the corrected incoming signal and the output signal, and this error signal and the tone reference are used to adapt the parameter.

In another baseband method aspect of the present invention, an interference tone in an incoming, sampled baseband signal in a QAM system is suppressed to produce an output signal by, initially, generating an interference tone reference from a delayed version of the incoming signal and a delayed version of the output signal. Then the interference tone reference is further delayed to produce a delayed interference tone reference. The delayed interference tone reference is weighted by an initial adaptive parameter to produce an interference tone estimate. The tone estimate is used to correct the incoming signal, and the corrected signal is threshold detected to produce the output signal. An error signal is derived from the corrected incoming signal and the output signal, and this error signal and the tone reference are used to adapt the parameter.

In still another baseband method aspect of the present invention, an interference tone in an incoming, sampled baseband signal in a QAM system is suppressed to produce and output signal by, initially, generating a corrected incoming signal from the incoming signal and an interference tone estimate, wherein the interference tone estimate is obtained by weighting an interference tone reference by a present adaptive parameter. The interference tone reference is obtained from a delayed version of the interference tone estimate and a delayed version of the output signal. The corrected incoming signal is threshold detected to produce the output signal. An error signal is derived from the corrected incoming signal and the output signal, and this error signal and the tone reference are used to adapt the parameter.

In yet another baseband method aspect of the present invention, an interference tone in an incoming, sampled baseband signal in a QAM system is suppressed to produce an output signal by, initially, generating an interference tone reference from a delayed version of the incoming signal and a delayed version of the output signal. The delayed interference tone reference is weighted by an initial adaptive FIR filter to produce an interference tone estimate. The tone estimate is used to correct the incoming signal, and the corrected signal is threshold detected to produce the output signal. An error signal is derived from the corrected incoming signal and the output signal, and this error signal and the tone reference are used to adapt the FIR filter.

In fact, wherever an adaptive parameter is utilized in any embodiment, it is also readily contemplated that a FIR filter can be substituted, and the FIR filter is adapted rather than the single parameter.

Broadly, in accordance with one passband method aspect of the present invention, an interference tone in an incoming, sampled passband signal in a QAM system is suppressed to produce a baseband output signal by, initially, rerotating the baseband output signal to produce a rerotated output signal at passband. Then, an interference tone reference at passband is generated from a delayed version of the incoming signal and a delayed version of the rerotated output signal. The interference tone reference is weighted by an initial adaptive parameter to produce an interference tone estimate, which is then used to generate a corrected incoming signal from the incoming passband signal. The corrected incoming signal is mixed to produce a baseband corrected signal. The baseband corrected signal is threshold detected to produce the baseband output signal. A baseband error signal is generated from the baseband corrected signal and the baseband output signal. The baseband error signal is rerotated to passband to produce a rerotated error signal, and a new adaptive parameter is generated from the initial adaptive parameter, the interference tone reference, and the rerotated error signal.

In accordance with another passband method aspect of the present invention, the foregoing passband interference cancellation method utilizes pre-filtering to mitigate the effects of noise. The pre-filtering step produces a new interference tone reference from the original interference tone reference, and this new interference tone reference is then weighted by the initial adaptive parameter to produce the interference tone estimate.

In accordance with yet another passband method aspect of the present invention, an interference tone in an incoming, sampled passband signal in a QAM system is suppressed to produce a baseband output signal by, initially, generating a passband corrected incoming signal from the incoming passband signal and a passband interference tone estimate, wherein passband interference tone estimate is obtained by weighting a passband interference tone reference by a present adaptive parameter. The passband interference tone reference is generated from a delayed version of the interference tone estimate and a delayed version of a passband error signal. The passband corrected incoming signal is mixed to generate a baseband corrected signal, and the corrected baseband signal is threshold detected to produce the baseband output signal. A baseband error signal is generated from the corrected baseband signal and the baseband output signal, with the passband error signal being derived from the baseband error signal by rerotation. The next adaptive parameter is then generated from the initial adaptive parameter, the passband interference tone reference, and the passband error signal.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

To gain an appreciation for the meritorious advance provided by the present invention, it is helpful to first present in overview fashion the electronic context for the present invention. This approach has the added advantage of introducing terminology and notation useful in describing the detailed embodiments of the present invention, which then follow the overview exposition.

Overview

Generally a digital demodulator samples an incoming analog waveform and uses digital signal processing techniques to decode or extract the information carried in the analog waveform. In QAM, the information is a digital code which is encoded by a modulator as an analog level and phase, or equivalently, as analog in-phase and quadrature components; the in-phase and quadrature components are substantially independent of each other in a QAM system. (Without loss of generality, the following description will be couched in terms of in-phase and quadrature components.) The encoded analog signal is filtered to limit the bandwidth of the signal, and then mixed with a carrier frequency for transmission.

Figure 1:
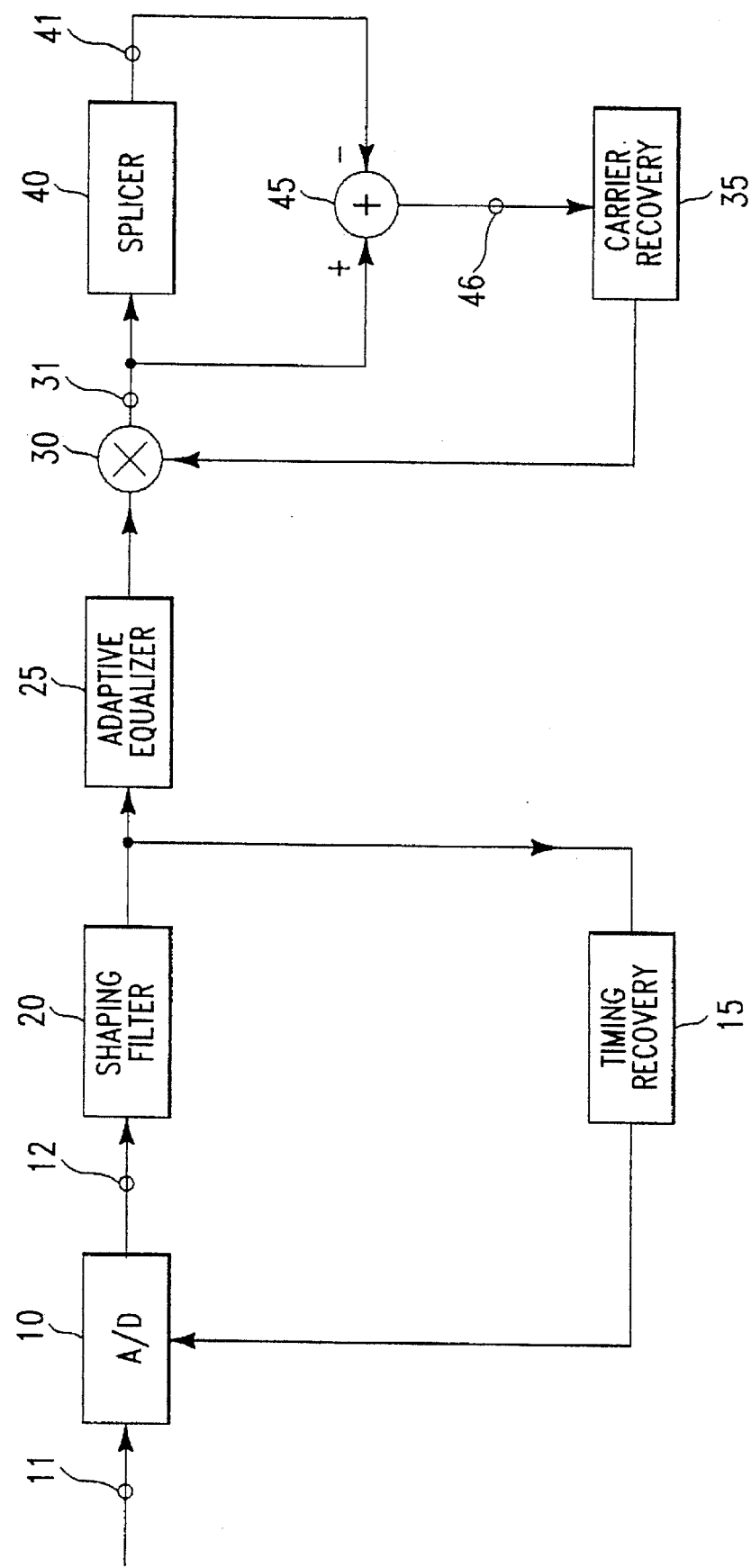
FIG. 1 illustrates a high-level block diagram of a prior art QAM demodulator.

An illustrative QAM digital demodulator is depicted in FIG. 1, with the focus being on that portion of the QAM demodulator which processes the incoming analog signal after it has been mixed down to an intermediate frequency (IF) and passed through a channel selection filter by a front-end tuner (not shown). As is the notational convention when describing QAM systems, the signals which appear in FIG. 1 are complex in nature, that is, the signals have real and imaginary parts which are commensurate with the in-phase and quadrature components of the QAM signals.

The output of mixing and filtering operations is the signal appearing on lead 11 in FIG. 1. Analog-to-digital (A/D) converter 10 samples the analog signal on lead 11 to generate a series of digital samples appearing on lead 12. The sampling rate for A/D converter 10 is controlled by timing recovery circuitry 15. The sampled signal appearing on lead 12 is filtered by shaping filter 20, which is configured to match the spectral shape of the transmission pulse shaping filter in the modulator. The overall, combined frequency response of the transmitter and receiver filters is selected to minimize intersymbol interference as well as provide filtering to maximize the signal-to-noise ratio in the presence of gaussian white noise.

The output of filter 20 serves as the input to timing recovery circuitry 15. In addition, the output of filter 20 is connected to adaptive equalizer 25; equalizer 25 is used to correct for linear distortions in the transmission channel. For instance, these distortions may arise from multi-path reflections in the channel or from filter mismatches in the tuner.

The output of equalizer 25 is mixed by mixer 30 to baseband from IF by a reference carrier generated by carrier recovery circuitry 35. The baseband signal from mixer 30, which appears on lead 31, is an estimate of the in-phase and quadrature components of the particular digital code (the signal appearing on lead 31 is referred to as the "soft decision"). Slicer 40 is used to select the closest digital code representative of the soft decision, and slicer 40 outputs via lead 41 the exact in-phase and quadrature components for that digital code (the signal appearing on lead 41 is referred to as the "hard decision"). The difference between the soft decision and the hard decision, performed by subtractor 45, is an error signal on lead 46 which is used to control carrier recovery circuitry 35.

Figure 2:
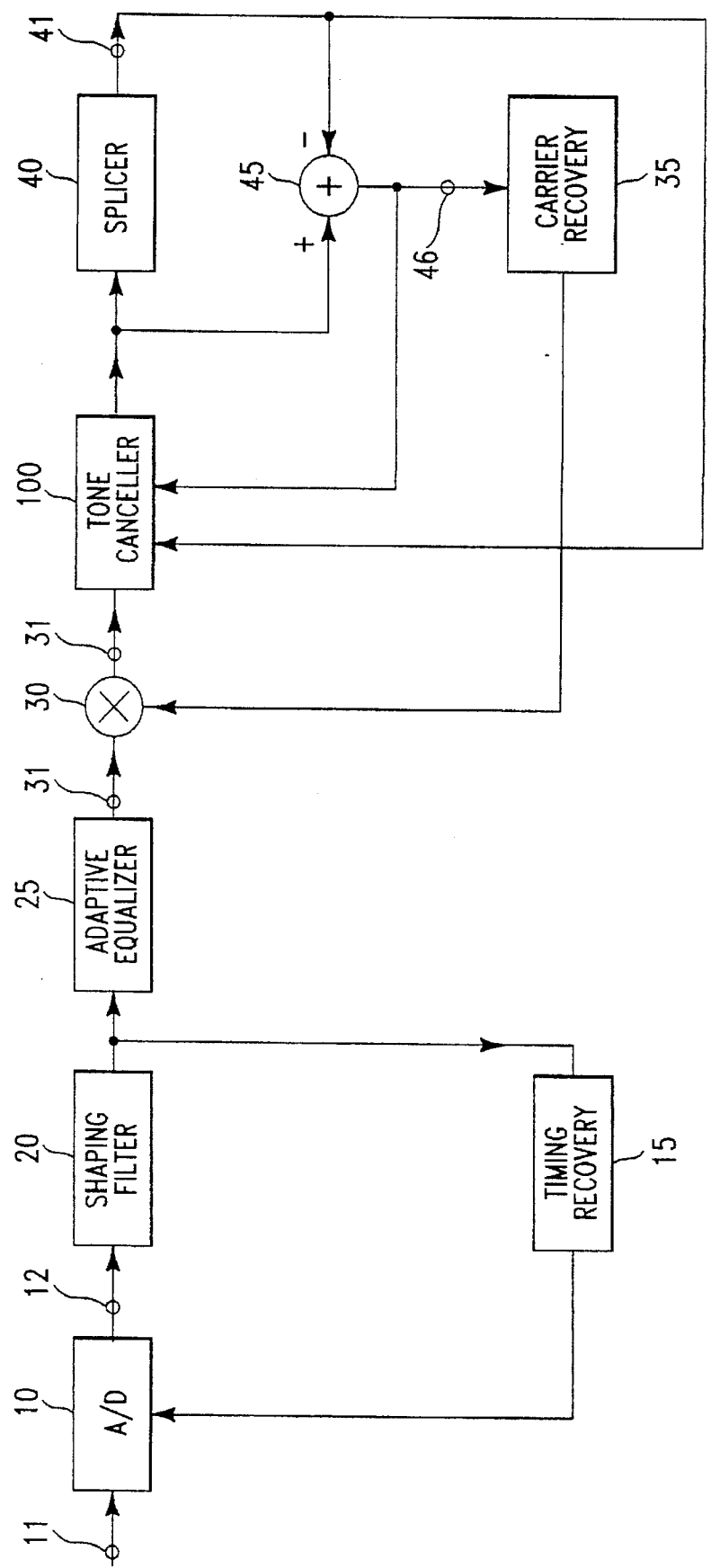
FIG. 2 illustrates a high-level block diagram of a QAM demodulator depicting the electronic connectivity of the baseband tone canceller in accordance with the present invention.

Now with reference to FIG. 2, there is shown, in accordance with the present invention, tone canceller 100 interposed between mixer 30 and slicer 40 and having the error signal on lead 46 and the output of slicer 40 on lead 41 as inputs. In this aspect of the present invention, tone canceller 100 is placed after mixer 30 and therefore operates on the baseband signal. Illustrative embodiments of tone canceller 100 are presented below.

Figure 3:
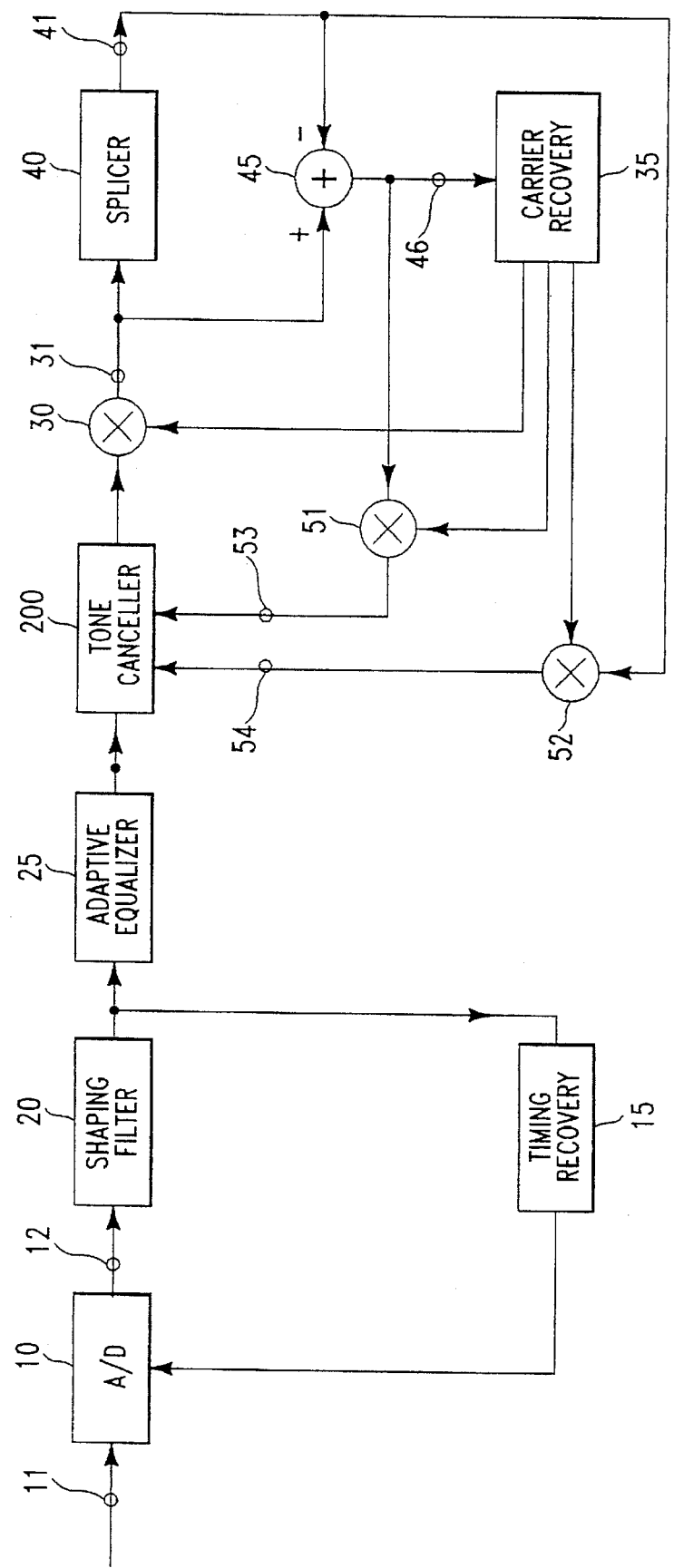
FIG. 3 illustrates a high-level block diagram of a QAM demodulator depicting the electronic connectivity of the passband tone canceller in accordance with the present invention.

Referring now to FIG. 3, there is shown, in accordance with the present invention, tone canceller 200 interposed between adaptive equalizer 25 and mixer 30 and having the signals on leads 53 and 54 as inputs. The signals on these leads are derived from mixers 51 and 52, respectively. Inputs to mixer 51 are provided by the error signal on lead 46 and carrier recovery circuitry 35; inputs to mixer 52 and provided by the output of slicer 40 and carrier recovery circuitry 35. The signal to mixer 51 from carrier recovery circuitry 35 is used to mix the error signal, which is at baseband, up to the passband for appropriate spectral alignment for processing in tone canceller 200—an operation referred to as "rerotation." Similarly, mixer 52 rerotates the output of slicer 40 to the passband. The signals provided by carrier recovery circuitry 35 to mixers 51 and 52 are the conjugate of the signal provided to mixer 30 by carrier recovery circuitry 35. In this aspect of the present invention, tone canceller 200 is placed before carrier recovery circuitry 35 and therefore operates on the passband signal. Illustrative embodiments of tone canceller 200 are presented below.

Figure 4:
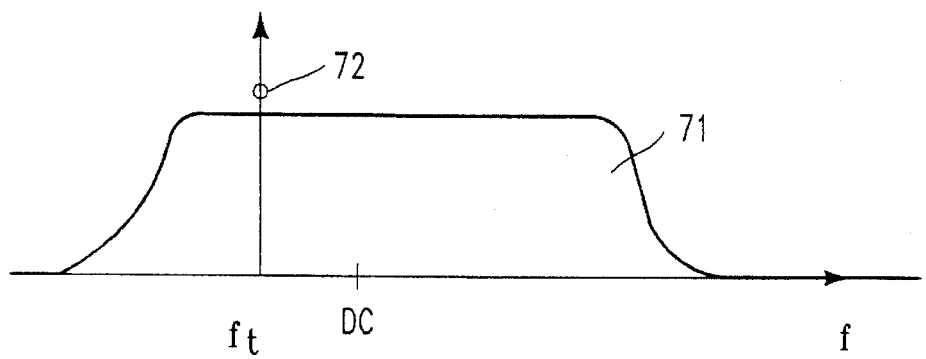
FIG. 4 depicts a spectral plot of an illustrative QAM signal showing the presence of an interference tone at baseband.
Figure 5:
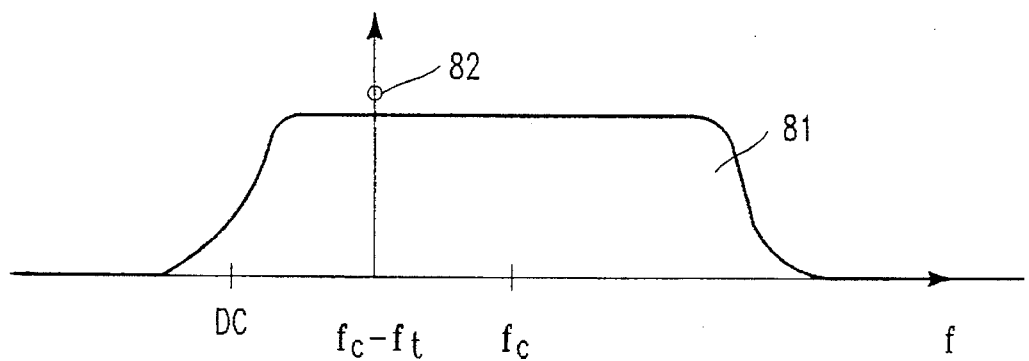
FIG. 5 depicts a spectral plot of an illustrative QAM signal showing the presence of an interference tone at passband.

To visualize the desired cancellation property of the tone cancellers of the present invention, reference is now made to FIG. 4, wherein a baseband signal spectrum, identified by reference numeral 71, is depicted for an illustrative digital code. The interference tone is represented by spectral line 72. Tone canceller 100 is implemented to mitigate the effect of spectral line 72. Now with reference to FIG. 5, the passband version of the spectrum for the digital code is identified by reference numeral 81, and the interfering tone by spectral line 82. Tone canceller 200 is implemented to mitigate the effect of spectral line 82.

Baseband Tone Canceller

Figure 6:
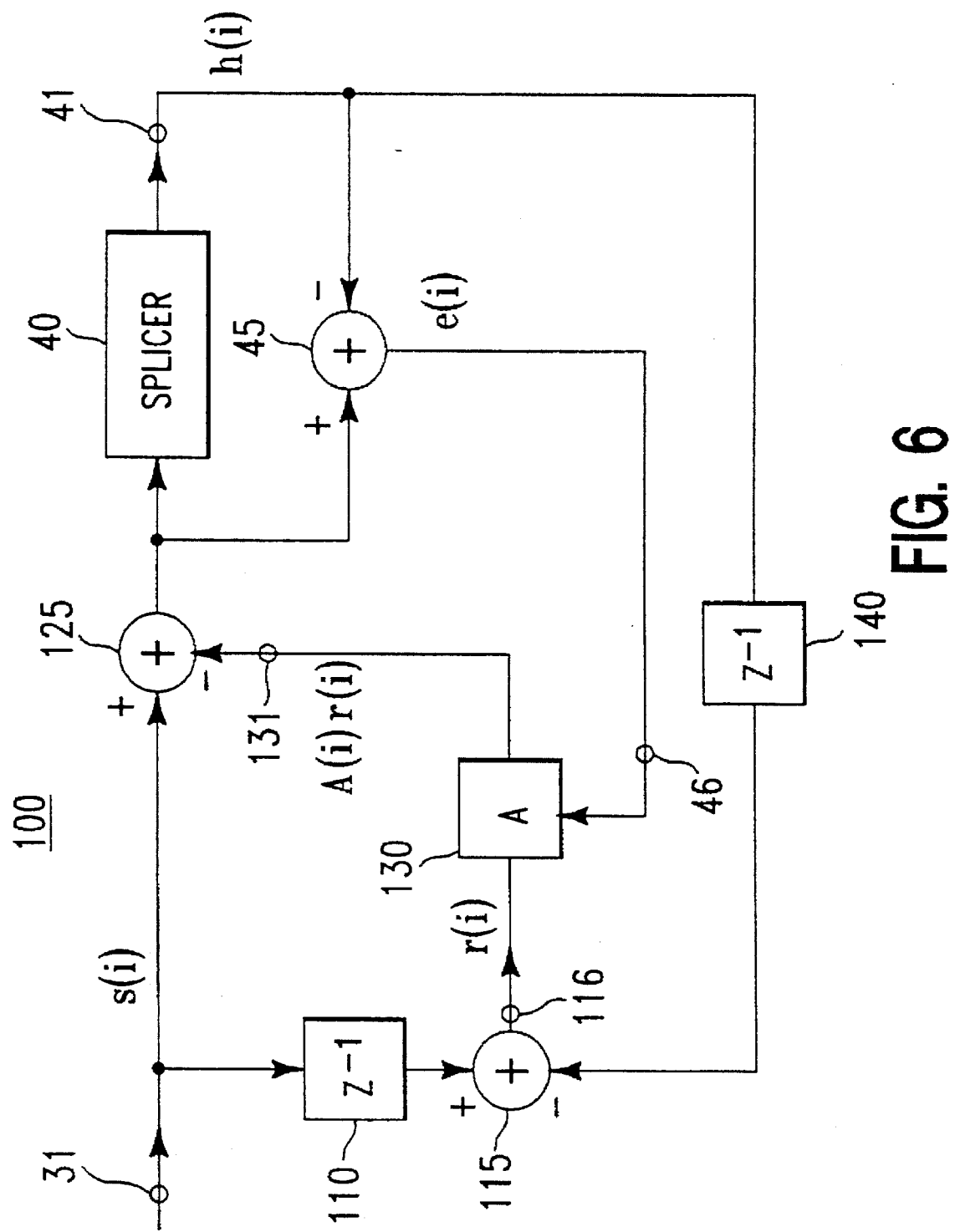
FIG. 6 illustrates a block diagram of one illustrative baseband tone canceller.

With reference to FIG. 6, there is shown one basic embodiment of tone canceller 100 of FIG. 2. Tone canceller 100 in FIG. 6 operates at baseband in that the signal appearing on lead 31 is representative of the output of carrier recovery mixer 30 of FIG. 1. Accordingly, lead 31 carries a sequence of sampled baseband symbol values each having an in-phase and quadrature component.

To describe the operation of tone canceller 100 of FIG. 6, it is presumed initially that a single interference tone at a fixed frequency within the transmitted spectrum of the QAM signal interferes with the desired signal, and that such a tone is detected by carrier recovery mixer 30 and passed along with the sequence of baseband symbols over lead 31 to tone canceller 100. The spectrum of an illustrative signal appearing on lead 31 is shown in FIG. 4, with the spectrum of the desired signal identified by reference numeral 71 and the interference tone identified by reference numeral 72. The interference tone is shown as having radian frequency $f_t$ in the baseband spectrum of the desired signal.

Broadly, tone canceller 100 of FIG. 6 is a discrete time processor which generates an estimate of the interference tone during the current processing interval, and subtracts the estimate from the incoming signal on lead 31 during the next processing interval to produce the output signal on lead 41. In mathematical terms, let the signal appearing on lead 31 be represented by s(i) (i.e., the soft decision):

$$s(i)=x(i)+t(i)+n(i), \quad (1)$$

where x(i) is the exact or desired symbol value, t(i) is the interference tone, and n(i) is random noise, all evaluated at the $i^{th}$ sampling instant. Further, it is supposed for analysis purposes that the output of slicer 40, appearing on lead 41, is the desired symbol value x(i). A delayed version of the signal appearing on lead 41 is subtracted from a delayed version of the signal appearing on lead 31, via subtractor 115, to yield a tone reference r(i) indicative of the interference tone t(i) (which remains corrupted by n(i)), that is, the signal appearing on lead 116 is given by $$r(i)=\pi(i-1)+n(i-1). \quad (2)$$

The delays to signals on leads 31 and 41 are effected by delay elements 110 and 140, respectively.

The tone reference $r(i)$ is then multiplied by an adaptive parameter $A(i)$ in processing device 130 to yield a tone estimate $A(i)r(i)$ appearing on lead 131; the parameter $A(i)$ is a gain and phase adjustment to the tone reference $r(i)$. The tone estimate is then subtracted from the incoming signal on lead 31 in subtractor 125. The output of subtractor 125, designated $c(i)$ (i.e., the corrected incoming signal), may be expressed as $$c(i)=s(i)-A(i)r(i). \quad (3)$$

The adaption of $A(i)$ is controlled by the product of a slice error and the conjugate of the tone reference. The slice error, designated $e(i)$, is formed by subtracting the output of slicer 40 from the input of slicer 40 in subtractor 45; this subtraction may be expressed as $$e(i)=c(i)-x(i). \quad (4)$$

Processing device 130 then generates the next estimate $A(i+1)$ in the following form:

$$A(i+1)=A(i)+\mu e(i)r(i)', \quad (5)$$

where $r(i)'$ is the conjugate of $r(i)$, and $\mu$ is a pre-determined adaption gain (the manner of selecting $\mu$ is described below). In the preferred embodiment, processor 130 is arranged to: receive $r(i)$ and $e(i)$ as inputs; form the conjugate of $r(i)$ to produce $r(i)'$; multiply $\mu$ (a stored quantity), $e(i)$, and $r(i)'$; form the summation of $A(i)$ and $\mu e(i)r(i)'$; and then store the sum as $A(i+1)$ in, for example, a register for use during the next processing interval.

Qualitatively, whenever the adaptive parameter $A(i+1)$ is misadjusted, tone canceller 100 allows a large component of the interference to pass through into the slice error $e(i)$; thus, the cross-correlation between the slice error $e(i)$ and the tone reference $r(i)$ will be non-zero. As parameter $A(i+1)$ approaches the correct value to cancel the interference tone $t(i)$, the component of the interference tone in the slice error $e(i)$ approaches zero and the cross-correlation approaches zero. Finally, when parameter $A(i+1)$ is correctly adjusted and the interference tone has been reduced essentially to zero in the slice error $e(i)$, the cross-correlation is zero.

In mathematical terms, analysis of the steady-state performance of $A(i+1)$ leads to the following equation:

$$\hat{A}(i+1)=\hat{A}(i)[1-\mu(Rtt(0)+Rnn(0)+Rtn(0)+Rnt(0)]+\mu[Rtt(\tau)+Rnn(\tau)+Rtn(\tau)+Rnt(\tau)], \quad (6)$$

where $Rij$ represents the correlation between the two variables $i$ and $j$, namely, $Rtt$ is the auto-correlation of the interference tone, $Rnn$ is the auto-correlation of the noise, and $Rtn$ or $Rnt$ is the cross-correlation of the interference tone and noise, $\hat{A}$ is the expected value of $A(i)$, and $\tau$ is the delay effected by delay device 110. If the noise is assumed to be white noise with variance $\sigma_n^2$, and the tone is uncorrelated with the noise and has power $\sigma_t^2$, then, equation (6) simplifies to:

$$\hat{A}(i+1)=\hat{A}(i)[1-v(\sigma_t^2+\sigma_n^2)]+vRtt(\tau). \quad (7)$$

If it is presumed that $Rtt(\tau)$ is constant for a constant $\tau$, for large $i$ (i.e. $i\to\infty$), then $$\hat{A}(i\to\infty)\to\rho_\tau/(1+\sigma_n^2/\sigma_t^2), \quad (8)$$

where $\rho_\tau$ is the normalized correlation coefficient over the delay $\tau$. For a single interfering tone, $\rho_\tau$ is a phase delay $e^{-j\omega_o\tau}$.

Thus, the parameter $\hat{A}(i\to\infty)$ of equation (8) represents the adjustment to the tone reference $r(i)$ exactly correlated with the interference tone $t(i)$ in the incoming signal $s(i)$ so as to cancel $t(i)$ to the level of the noise floor.

Note that in the absence of an interference tone, the tone reference $r(i)$ and the slice error $e(i)$ do not correlate and the expected value of the adaptive coefficient $A(i+1)$ is zero. Thus, no correction is added to the incoming signal $s(i)$ to yield the corrected signal $c(i)$.

The difference relation expressed by equation (7) is used to determine the range on adaption gain $\mu$. If the z-transform of equation (7) is taken, the following obtains:

$$z\hat{A}(z)=\hat{A}(z)[1-\mu(\sigma_t^2+\sigma_n^2)]+\mu Rtt(z). \quad (9)$$

In order to achieve and maintain a stable system expressed by equation (9), it is necessary to impose the following conditions on $\mu$:

$$0<\mu<2/(\sigma_t^2+\sigma_n^2). \quad (10)$$

There is generally a noise enhancement effect due to the cancellation process. Because the tone reference $r(i)$ has a component of random noise $n(i)$ as well as the interference tone $t(i)$, when the adjusted reference is added to the soft decision $s(i)$, the noise on the reference is also added, as noted above. The effective noise gain can be expressed as:

$$G=1+|a|^2. \quad (11)$$

In the exemplary case discussed above, where the adaptive parameter is expressed as a phase delay in steady-state, and the noise variance is much less than the tone power, there is approximately a 3 dB gain in the noise power. Later, an arrangement to reduce the noise power is discussed.

Figure 7:
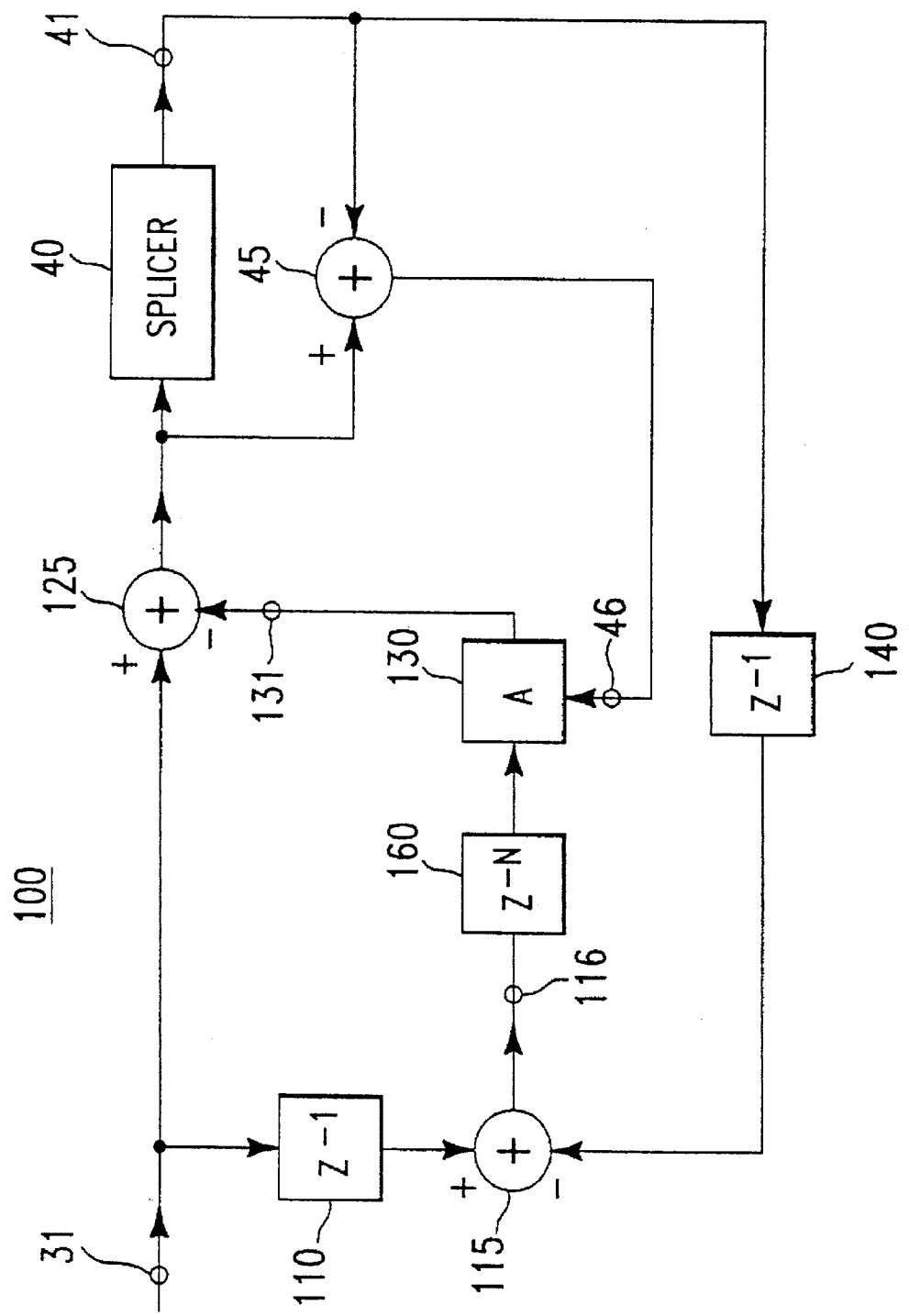
FIG. 7 illustrates a block diagram of another illustrative baseband tone canceller.

If there is a correlation between the tone reference and the slice error other than that due to the interference, the performance of tone canceller 100 can be somewhat degraded. This situation occurs if the noise in the system is not white but correlated. The parameter $A(i)$ will then adapt to a value which is a compromise between the cancellation of the interference and the decorrelation of the noise. To mitigate the effect of the correlated noise, an alternative arrangement for tone canceller 100, depicted in FIG. 7, may be implemented. In this version of tone canceller 100, the tone reference $t(i)$ is delayed by N symbols by delay device 160, where N is chosen sufficiently large to decorrelate the noise samples.

Since the tone reference $r(i)$ is a function of the soft decision before cancellation and the hard decision, the tone reference may be shown to have the following form:

$$r(i)=e(i-1)+a(i-1)r(i-1). \quad (12)$$

Figure 8:
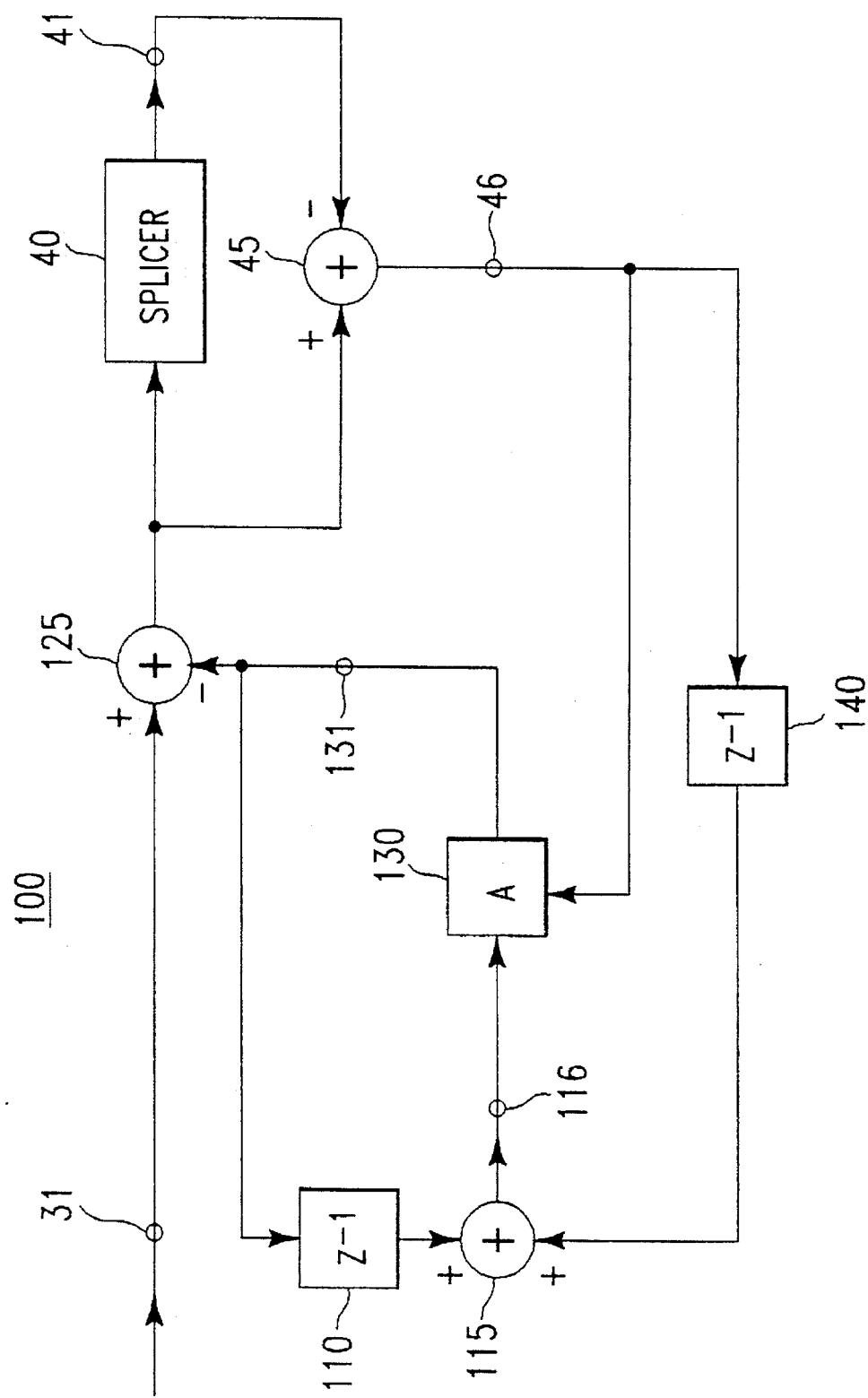
FIG. 8 illustrates a block diagram of yet another illustrative baseband tone canceller.

From the form of equation (12), another version of tone canceller 100 may be realized, as shown in FIG. 8. The only differences between FIG. 6 and FIG. 8 are that: (i) the input to delay device 110 is derived from lead 131 having the tone reference $r(i)$ rather than input lead 31 having $s(i)$; and (ii) the input to delay device 140 is provided by the slice error on lead 46.

Figure 9:
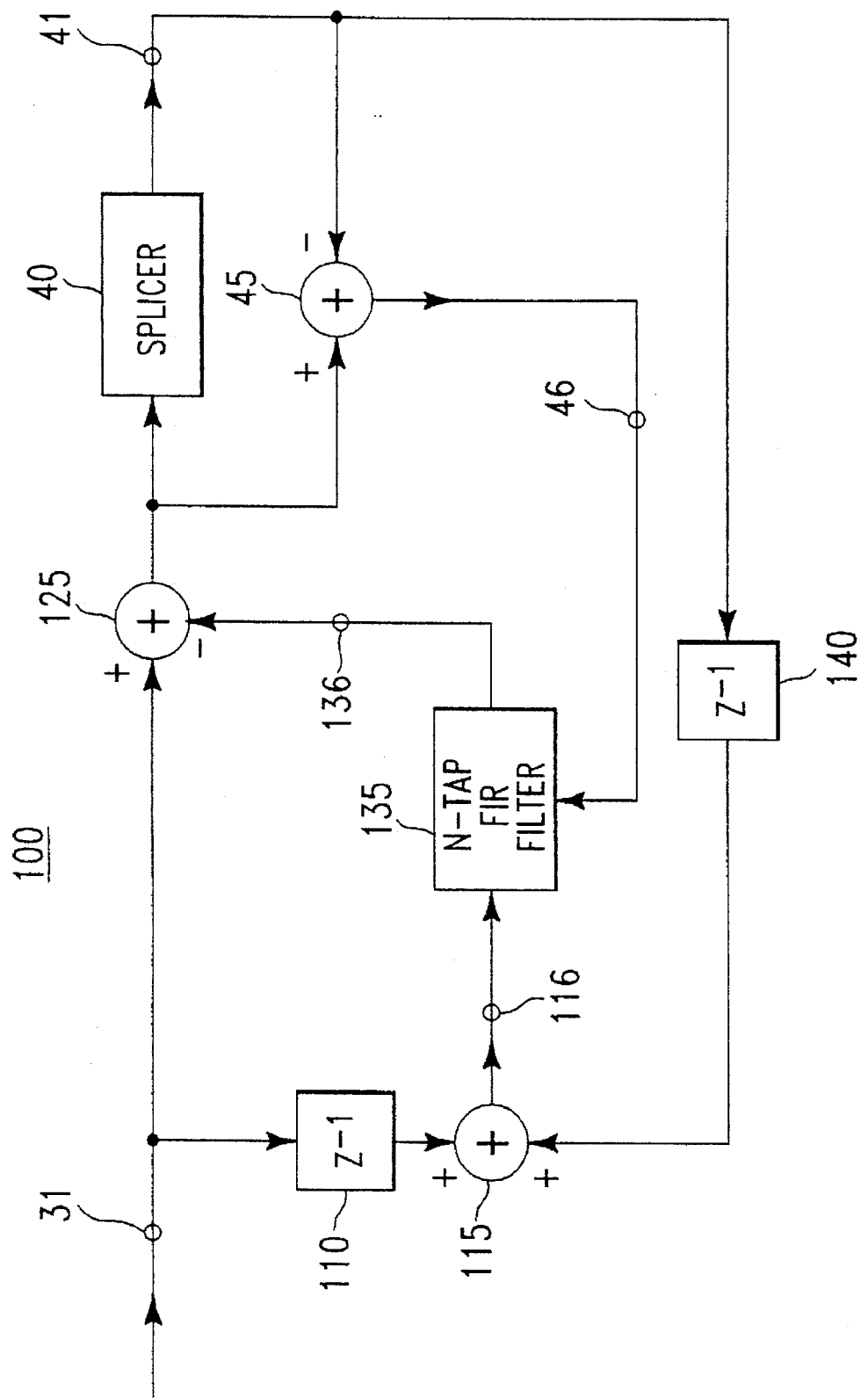
FIG. 9 illustrates a block diagram of still another illustrative baseband tone canceller.

To this point in the description, the realizations of tone canceller 100 have been based upon a single adaptive parameter $A(i)$. Those with ordinary skill in the art will readily appreciated that an adaptive filter, such as an FIR filter having variable coefficients, can replace element 130. Such a realization of tone canceller 100 is shown in FIG. 9 wherein FIR filter 135 is shown in place of element 130. Filter 135 adapts to match the bandshape of the interference and thus reduces the noise enhancement discussed above. For example, an N-tap FIR filter 135 may be configured such that all the taps delay and sum the tone estimate coherently, thereby providing a power gain of $N^2$. The corresponding noise power out of FIR filter 135 would then be 1/N, so the noise gain becomes $$G=1+7/N. \tag{13}$$

Thus, only 4 taps would yield a noise enhancement of only 1 dB.

It will also be readily appreciated that FIR filter 135 may also be arranged to cancel multiple tones, as each tap could independently adapt to a separate tone.

Finally, it is instructive to elucidate, as a prelude for the next section, what has been alluded to above but which remained essentially implicit in the foregoing description, namely, that the QAM signal appearing on lead 31 has both in-phase and quadrature components which, ideally, are independent. Thus, mixer 30 of FIG. 2 is presumed to have a complex demodulation signal of the form $e^{-j\omega_c t}$ supplied by carrier recovery circuitry 35, where $\omega_c$ is the IF radian frequency. The in-phase component of the signal on lead 31 is mixed with the cosine part of the complex demodulation signal, whereas the quadrature component is mixed with the sine part of the complex demodulation signal, and the two components are then processed in two separately realizable branches of tone canceller 100. Moreover, since the baseband signal s(i) is presumed to appear on lead 31 in the foregoing discussion, then the signal on lead 26 is a passband signal which may be expressed as $s(i)e^{j\omega_c t}$. It is clear then that any signal provided to or derived by a tone canceller operating at passband, such as tone canceller 200 in FIG. 3, will be expressed with the multiplicative factor $e^{j\omega_c t}$, that is, be "rerotated", so as to locate the signal in the frequency domain in a manner consistent with the frequency spectrum of the signal incoming on lead 26.

Passband Tone Canceller

Figure 10:
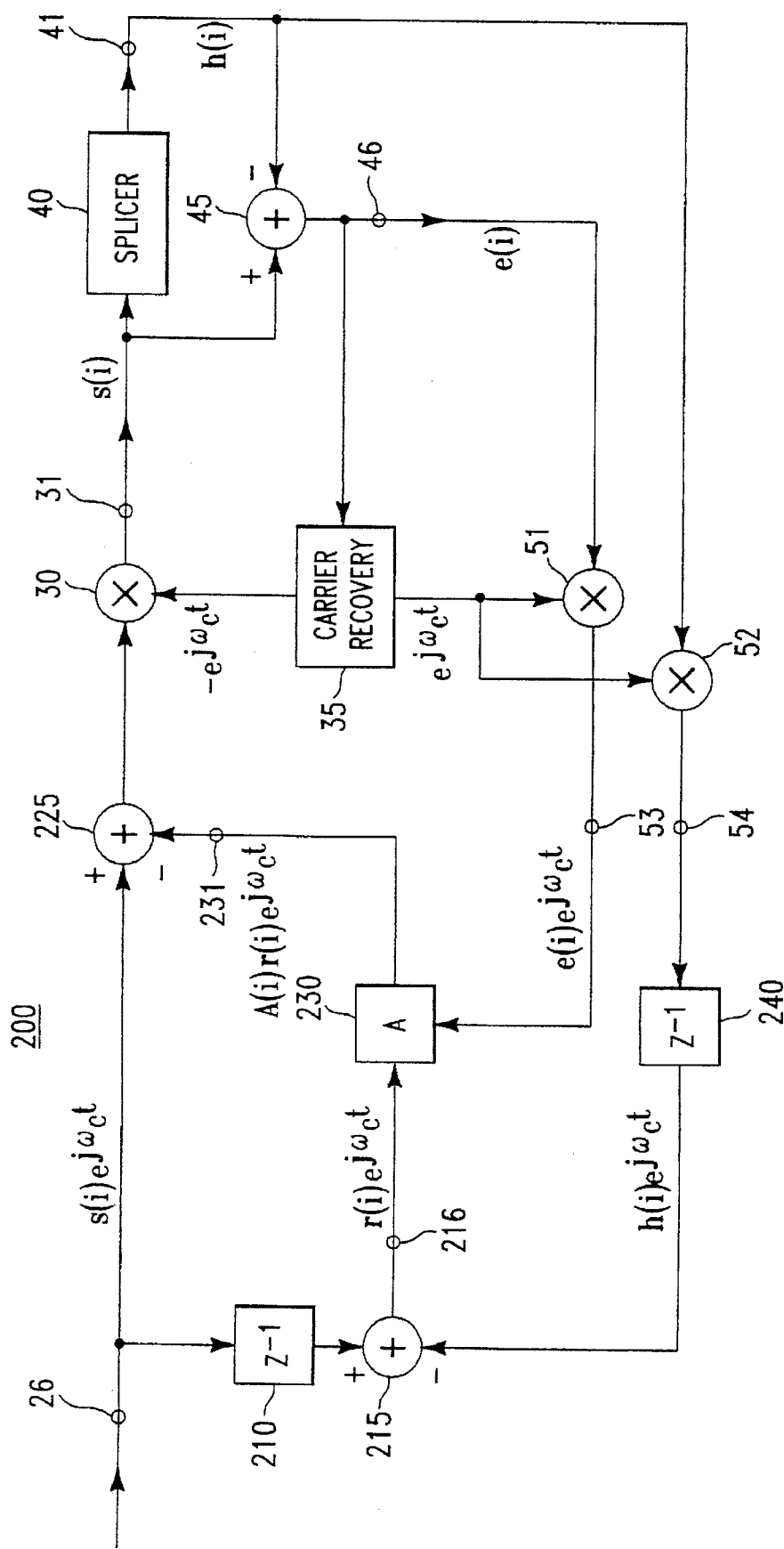
FIG. 10 illustrates a block diagram of one illustrative passband tone canceller.

With reference to FIG. 10, there is shown passband tone canceller 200 in accordance with the present invention; tone canceller 200 is commensurate with and may be compared to the arrangement of tone canceller 100 of FIG. 6. In particular, a tone reference, which appears on lead 216, is formed in subtractor 215 as the difference between a delayed version of the input signal appearing on lead 26 and a delayed version of the rerotated output signal appearing on lead 54; the delays are effected by delay devices 210 and 240, respectively. If signal s(i) is on lead 31, h(i) is on lead 41, and e(i) is on lead 46 (commensurate with FIG. 6), and carrier recovery circuitry 35 provides the complex demodulation signal $e^{-j\omega_c t}$ to mixer 30 and its conjugate $e^{j\omega_c t}$ to mixers 51 and 52, then the signal on lead 216 may be expressed as $r(i)e^{j\omega_c t}$, and the signal on lead 231 is $A(i)r(i)e^{j\omega_c t}$. Moreover, processing circuitry computes the next coefficient A(i+1) as follows:

$$A(i+1)=A(i)+\mu e(i)e^{j\omega_c t}r(i)'e^{-j\omega_c t}=A(i)+\mu e(i)r(i)'. \tag{14}$$

Thus, the computation of A(i+1) is the same at passband as at baseband. Moreover, the gain factor µ is selected in the same manner as in the baseband case, that is, equation (10) must be satisfied.

Figure 11:
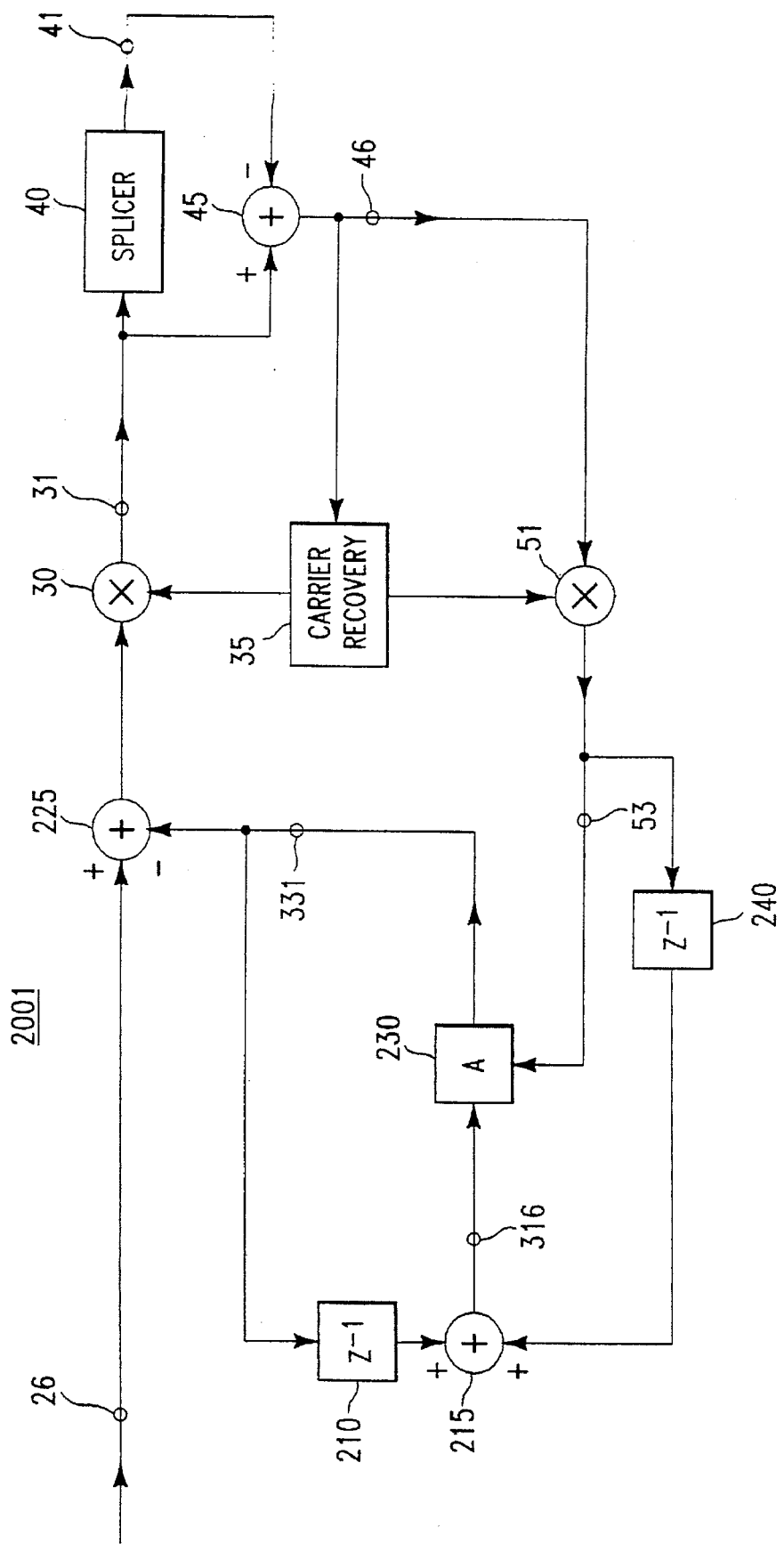
FIG. 11 illustrates a block diagram of another illustrative passband tone canceller.

With reference to FIG. 11, there is shown passband tone canceller 2001 in accordance with the present invention. Canceller 2001 is a variation on canceller 200 in that the tone reference on lead 316 is derived from the rerotated slice error on lead 53 and the previous tone estimate appearing on lead 331. Otherwise, the operation of canceller 2001 is commensurate with the operation of canceller 200 of FIG. 10. With the circuit arrangement of FIG. 11, the hard decisions from slicer 41 need not be rerotated, thereby simplifying the architecture.

Pre-filtering to Reduce Noise Enhancement

Figure 12:
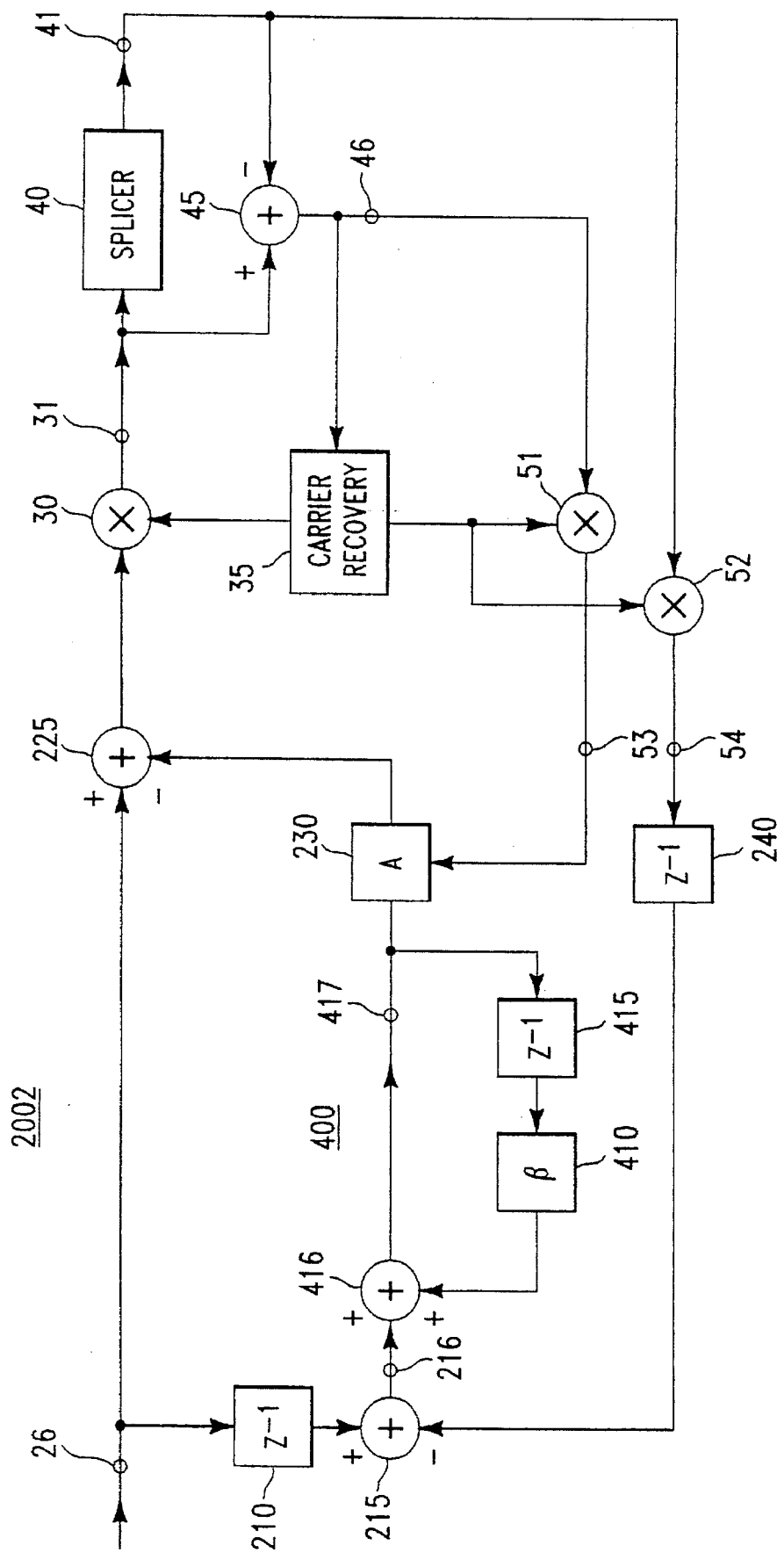
FIG. 12 illustrates a block diagram of yet another illustrative passband tone canceller.

The noise enhancement as expressed, for example, by equations (11) and (13) in the baseband discussion, can be mitigated by a pre-filter arrangement in certain situations. In the specific case of canceling a NTSC carrier, the interference tone is known relative to the QAM signal carrier. For instance, if the QAM signal is centered in the same 6 MHz channel as a NTSC signal, the interference tone from the co-channel picture carrier of NTSC will occur at −1.75 MHz with respect to the QAM carrier. Such knowledge about the location of the interference tone can be used to construct a pre-filter which reduces noise away from the expected interference tone frequency. The noise power in the tone estimate used to correct the incoming signal is then the ratio of the wideband filter gain over the gain of the filter at the interference frequency. Illustrative of such an improvement is the filter arrangement depicted by tone canceller 2002 in FIG. 12. Tone canceller 2002 is essentially the same arrangement as tone canceller 200 of FIG. 10 except that single pole, IIR fixed filter 400 is shown as being interposed between adder 215 and processing device 230. Filter 400 is composed of delay element 415, gain device 410 (having a gain factor β), and adder 416. Adder 416 receives as inputs both the original tone reference carried by lead 216 and the new tone reference carried by lead 417. The new tone reference on lead 417 also serves as the sole input to delay element 415 and, in turn, the output of delay element 415 serves as the sole input to gain device 410. The amplitude response of filter 400 is set to peak at the expected interference tone frequency, such as the frequency 1.75 MHz below the QAM carrier in the given example.

The characteristic equation of filter 400 may be expressed as $$f(i)=\beta f(i-1)+r(i), \tag{15}$$

where f(i) appears on lead 417, $\beta=be^{j\omega_0}$, with 0<b<1 being a fixed gain and $$\omega_0 = 2\pi \frac{f_i}{f_s},$$

wherein $f_s$ is the sampling frequency. The total noise enhancement may then be expressed as $$G=2/(1-b). \tag{16}$$

As is evidenced by equation (16), the total noise enhancement is always less than 3 dB and approaches 0 dB as b approaches 1. The gain b is chosen as a trade-off between the narrowness of the filter characteristic (i.e., reduced noise enhancement) and the uncertainty as to the precise location of the interfering tone; a value of b=0.85 is typical.

Although various embodiments which incorporate the teachings of the present invention have been shown and described in detail herein, those skilled in the art can readily devise many other varied embodiments that still incorporate these teachings.

I claim:

1. A method for canceling an interference tone in an incoming, sampled baseband QAM signal to produce an output signal, the method comprising the steps of generating an interference tone reference based on the incoming signal and the output signal, generating an adaptive interference tone estimate corresponding to the interference tone reference, generating a corrected incoming signal from the incoming signal and the interference tone estimate, generating the output signal with reference to the corrected incoming signal, and adapting the interference tone estimate with reference to an error between the corrected incoming signal and the output signal, the output signal, and the interference tone reference.

2. The method as recited in claim 1 wherein the step of generating the interference tone reference includes the step of delaying the incoming signal and the step of delaying the output signal, the step of generating the adaptive interference tone estimate includes the step of weighting the interference tone reference by an initial adaptive parameter to produce the interference tone estimate, the step of generating the output signal includes the step of threshold detecting the corrected incoming signal to produce the output signal, and the step of adapting the interference tone estimate includes the step of generating an error signal from the corrected incoming signal and the output signal, and the step of generating a new adaptive parameter from the initial adaptive parameter, the interference tone reference, and the error signal.

3. The method as recited in claim 2 wherein the step of generating a new adaptive parameter includes the step of adding the initial adaptive parameter and the product of: the conjugate of the interference tone reference; the error signal; and a pre-determined gain parameter.

4. The method as recited in claim 1 wherein the step of generating the interference tone reference includes the step of subtracting a delayed version of the output signal from a delayed version of the incoming signal, the step of generating the adaptive interference tone estimate includes the step of multiplying the interference tone reference by an initial adaptive parameter to produce the adaptive interference tone estimate, the step of generating the output signal includes the step of generating the corrected incoming signal by subtracting the adaptive interference tone estimate from the incoming signal, and the step of slicing the corrected incoming signal to produce the output signal, and the step of adapting the interference tone estimate includes the step of generating an error signal by subtracting the output signal from the corrected incoming signal, and the step of generating a new adaptive parameter by adding the initial adaptive parameter to the product of: the conjugate of the interference tone reference; the error signal; and a pre-determined gain parameter.

5. The method as recited in claim 1 wherein the step of generating the interference tone reference includes the step of delaying the incoming signal and the step of delaying the output signal, the step of generating the adaptive interference tone estimate includes the step of delaying the interference tone reference to produce a delayed tone reference and the step of weighting the delayed tone reference by an initial adaptive parameter to produce the interference tone estimate, the step of generating the output signal includes the step of threshold detecting the corrected incoming signal to produce the output signal, and the step of adapting the interference tone estimate includes the step of generating an error signal from the corrected incoming signal and the output signal, and the step of generating a new adaptive parameter from the initial adaptive parameter, the delayed tone reference, and the error signal.

6. The method as recited in claim 5 wherein the step of generating a new adaptive parameter includes the step of adding the initial adaptive parameter and the product of: the conjugate of the delayed tone reference; the error signal; and a pre-determined gain parameter.

7. The method as recited in claim 1 wherein the step of generating the interference tone reference includes the step of subtracting a delayed version of the output signal from a delayed version of the incoming signal, the step of generating the adaptive interference tone estimate includes the step of delaying the interference tone reference to produce a delayed tone reference and the step of multiplying the delayed tone reference by an initial adaptive parameter to produce the adaptive interference tone estimate, the step of generating the output signal includes the step of generating the corrected incoming signal by subtracting the interference tone estimate from the incoming signal, and the step of slicing the corrected incoming signal to produce the output signal, and the step of adapting the interference tone estimate includes the step of generating an error signal by subtracting the output signal from the corrected incoming signal, and the step of generating a new adaptive parameter by adding the initial adaptive parameter to the product of: the conjugate of the delayed tone reference; the error signal; and a pre-determined gain parameter.

8. The method as recited in claim 1 wherein the step of generating the interference tone reference includes the step of delaying the incoming signal and the step of delaying the output signal, the step of generating the adaptive interference tone estimate includes the step of weighting the interference tone reference by an initial adaptive filter to produce the interference tone estimate, the step of generating the output signal includes the step of threshold detecting the corrected incoming signal to produce the output signal, and the step of adapting the interference tone estimate includes the step of generating an error signal from the corrected incoming signal and the output signal, and the step of generating a new adaptive filter with reference to the interference tone reference and the error signal.

9. The method as recited in claim 8 wherein the step of generating a new adaptive filter includes the step of modifying adaptive filter parameters based on the interference tone reference and the error signal.

10. The method as recited in claim 1 wherein the step of generating the interference tone reference includes the step of subtracting a delayed version of the output signal from a delayed version of the incoming signal, the step of generating the interference tone estimate includes the step of processing the interference tone reference by the initial adaptive filter to produce an interference tone estimate, the step of generating the output signal includes the step of generating the corrected incoming signal by subtracting the interference tone estimate from the incoming signal, and the step of slicing the corrected incoming signal to produce the output signal, and the step of adapting the interference tone estimate includes the step of generating an error signal by subtracting the output signal from the corrected incoming signal, and the step of modifying adaptive filter parameters based on the interference tone reference and the error signal.

11. A method for canceling an interference tone in an incoming, sampled baseband signal to produce an output signal, the method comprising the steps of (a) selecting an initial adaptive circuit and setting a current adaptive circuit to the initial adaptive circuit, (b) generating an interference tone reference based on the incoming signal and the output signal, (c) generating an adaptive interference tone estimate by processing the interference tone reference with the current adaptive circuit, (d) generating a corrected incoming signal from the incoming signal and the interference tone estimate, (e) generating the output signal with reference to the corrected incoming signal, (f) adapting the current adaptive circuit with reference to an error between the corrected incoming signal and the output signal, the output signal, and the interference tone reference to generate a new adaptive circuit, and setting the current adaptive circuit to the new adaptive circuit, and (f) returning to step (b).

12. The method as recited in claim 11 wherein the step of selecting an initial adaptive circuit includes the step of selecting an initial adaptive parameter and setting a current adaptive parameter to the initial adaptive parameter, the step of generating an interference tone reference includes the step of generating the tone reference from a delayed version of the incoming sampled signal and a delayed version of the output signal, the step of generating an adaptive interference tone estimate includes the step of weighting the interference tone reference by the current adaptive parameter to produce the adaptive interference tone estimate, the step of generating the output signal includes the step of threshold detecting the corrected incoming sampled signal to produce the output signal, and the step of generating the current adaptive circuit includes the step of generating an error signal from the corrected incoming sampled signal and the output signal, the step of generating a new adaptive parameter from the initial adaptive parameter, the interference tone reference, and the error signal, and the step of setting the current adaptive parameter to the new adaptive parameter.

13. A method in a QAM system for canceling an interference tone in an incoming, sampled baseband signal having in-phase and quadrature components to produce in-phase and quadrature components of an output signal, the method for each of the components comprising the steps of generating an interference tone reference based on the incoming signal and the output signal, generating an adaptive interference tone estimate corresponding to the interference tone reference, generating a corrected incoming signal from the incoming signal and the interference tone estimate, generating the output signal with reference to the corrected incoming signal, and adapting the interference tone estimate with reference to an error between the corrected incoming signal and the output signal, the output signal, and the interference tone reference.

14. A method for canceling an interference tone in an incoming, sampled QAM baseband signal to produce an output signal, the method comprising the steps of generating an adaptive interference tone estimate from an interference tone reference, generating a corrected incoming signal from the incoming signal and the adaptive interference tone estimate, generating an error signal from the corrected incoming signal and the output signal, generating the interference tone reference based on the error signal and the adaptive interference tone estimate, generating the output signal with reference to the corrected incoming signal and adapting the interference tone estimate with reference to an error between the corrected incoming signal and the output signal, the output signal, and the interference tone reference.

15. The method as recited in claim 14 wherein the step of generating the adaptive interference tone estimate includes the step of generating an initial adaptive parameter and the step of adding the initial adaptive parameter and the product of: the conjugate of the interference tone reference; the error signal; and a pre-determined gain parameter.

16. The method as recited in claim 14 wherein the step of generating the interference tone reference includes the step of subtracting a delayed version of the error signal from a delayed version of the incoming signal, the step of generating the adaptive interference tone estimate includes the step of multiplying the interference tone reference by an initial adaptive parameter to produce the adaptive interference tone estimate, the step of generating the output signal includes the step of generating the corrected incoming signal by subtracting the adaptive interference tone estimate from the incoming signal, and the step of slicing the corrected incoming signal to produce the output signal, and the step of adapting the interference tone estimate includes the step of generating the error signal by subtracting the output signal from the corrected incoming signal, and the step of generating a new adaptive parameter by adding the initial adaptive parameter to the product of: the conjugate of the interference tone reference; the error signal; and a pre-determined gain parameter.

17. A method for canceling an interference tone in an incoming, sampled passband QAM signal to produce a baseband output signal, the method comprising the steps of rerotating the baseband output signal to produce a rerotated output signal at passband, generating an interference tone reference based on the incoming signal and the rerotated output signal, generating an adaptive interference tone estimate corresponding to the interference tone reference, generating the output signal with reference to the incoming signal and the interference tone estimate, and adapting the interference tone estimate with reference to the incoming signal, the rerotated output signal, and the interference tone reference.

18. The method as recited in claim 17 wherein the step of generating an interference tone reference includes the step of subtracting a delayed version of the incoming signal and a delayed version of the rerotated output signal, the step of generating an adaptive interference tone estimate includes the step of weighting the interference tone reference by an initial adaptive parameter to produce the adaptive interference tone estimate, the step of generating the output signal includes the step of generating a corrected incoming signal from the incoming signal and the interference tone estimate, the step of mixing the corrected incoming signal to produce a baseband corrected signal, and the step of threshold detecting the baseband corrected signal to produce the baseband output signal, and the step of adapting the interference tone estimate includes the step of generating an error signal from the baseband corrected signal and the baseband output signal, the step of rerotating the error signal to passband to produce a rerotated error signal, and the step of generating a new adaptive parameter from the initial adaptive parameter, the interference tone reference, and the rerotated error signal.

19. The method as recited in claim 18 further including the step of generating a modified passband interference tone reference by filtering the passband interference tone reference, and the step of weighting the modified interference tone reference by the initial adaptive parameter to produce the adaptive interference tone estimate.

20. A method for canceling an interference tone in an incoming, sampled passband QAM signal to produce a baseband output signal, the method comprising the steps of generating a passband adaptive interference tone estimate from a passband interference tone reference, generating a corrected incoming passband signal from the incoming signal and the adaptive interference tone estimate, generating a corrected incoming baseband signal from the corrected incoming passband signal, generating the baseband output signal with reference to the corrected incoming baseband signal, generating the interference tone reference based on the interference tone estimate and a rerotated baseband error signal, the baseband error signal determined from the corrected incoming baseband signal and the baseband output signal, and adapting the interference tone estimate with reference to the rerotated error signal and the interference tone reference.

21. Circuitry for canceling an interference tone in an incoming, sampled baseband QAM signal to produce an output signal, the circuitry comprising means for generating an interference tone reference based on the incoming signal and the output signal, means, responsive to the means for generating the interference tone estimate, for generating an adaptive interference tone estimate corresponding to the interference tone reference, means, responsive to the incoming signal and the means for generating the interference tone estimate, for generating a corrected incoming signal from the incoming signal and the interference tone estimate, means, responsive to the means for generating the corrected incoming signal, for generating the output signal with reference to the corrected incoming signal, and means, responsive to an error between the corrected incoming signal and the output signal, the output signal and the means for generating the interference tone reference, for adapting the interference tone estimate.

22. Circuitry for canceling an interference tone in an incoming, sampled QAM baseband signal to produce an output signal, the circuitry comprising means for generating an adaptive interference tone estimate from an interference tone reference, means, responsive to the means for generating the adaptive interference tone estimate, for generating a corrected incoming signal from the incoming signal and the adaptive interference tone estimate, means, responsive to the means for generating the corrected incoming signal and the output signal, for generating an error signal, means, responsive to the means for generating the error signal and the means for generating the adaptive interference tone estimate, for generating the interference tone reference based on the error signal and the adaptive interference tone estimate, means, responsive to the means for generating the adaptive interference tone estimate, for generating the output signal with reference to the corrected incoming signal, and means, responsive to the means for generating the corrected incoming signal, the output signal, and the means for generating the interference tone reference, for adapting the interference tone estimate.

23. Circuitry for canceling an interference tone in an incoming, sampled passband QAM signal to produce a baseband output signal, the circuitry comprising means for rerotating the baseband output signal to produce a rerotated output signal at passband, means, responsive to the incoming signal and the rerotated output signal, for generating an interference tone reference based on the incoming signal and the rerotated output signal, means, responsive to the means for generating the interference tone reference, for generating an adaptive interference tone estimate corresponding to the interference tone reference, means, responsive to the incoming signal and the means for generating the interference tone reference, for generating the output signal with reference to the incoming signal and the interference tone estimate, and means, responsive to the incoming signal, the rerotated output signal, and the means for generating the interference tone reference, for adapting the interference tone estimate.

24. Circuitry for canceling an interference tone in an incoming, sampled passband QAM signal to produce a baseband output signal, the circuitry comprising means for generating a passband adaptive interference tone estimate from a passband interference tone reference, means, responsive to the incoming signal and the means for generating the passband adaptive interference tone estimate, for generating a corrected incoming passband signal from the incoming signal and the adaptive interference tone estimate, means, responsive to the means for generating the corrected incoming passband signal, for generating a corrected incoming baseband signal from the corrected incoming passband signal, means, responsive to the means for generating the corrected incoming baseband signal, for generating the baseband output signal with reference to the corrected incoming baseband signal, means, responsive to the corrected incoming baseband signal and the baseband output signal, for generating a baseband error signal and for rerotating the baseband error signal to obtain a rerotated error signal, means, responsive to the means for generating the passband adaptive interference tone estimate and the means for generating the rerotated error signal, for generating the interference tone reference based on the adaptive interference tone estimate and a rerotated error signal, and means, responsive to the means for generating the rerotated error signal and the means for generating the interference tone reference, for adapting the interference tone estimate.

\* \* \* \* \*